Sept. 4, 1945.  G. A. WALDIE  2,384,221
VALVE CONTROL MECHANISM
Filed Oct. 1, 1942
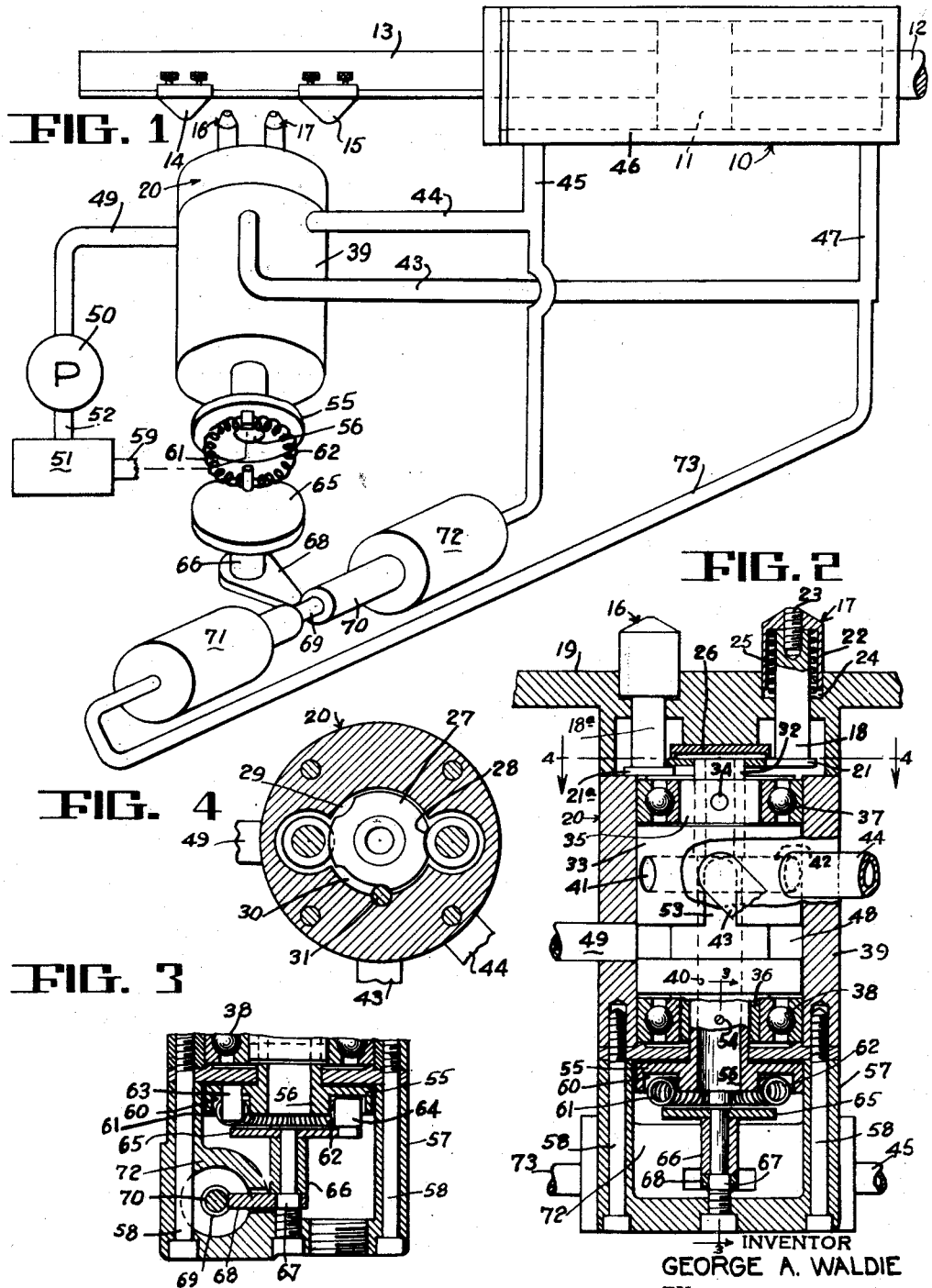
INVENTOR
GEORGE A. WALDIE
BY
Toulmin & Toulmin
ATTORNEYS Patented Sept. 4, 1945

2,384,221

UNITED STATES PATENT OFFICE 2,384,221

VALVE CONTROL MECHANISM

George A. Waldie, Edison, Ohio, assignor to The Hydraulic Development Corporation, Inc., Wilmington, Del., a corporation of Delaware Application October 1, 1942, Serial No. 460,453

3 Claims. (Cl. 121—155)

This invention relates to control mechanism and, in particular, to control mechanism for actuating a reciprocable element, such as a valve member.

It is an object of this invention to provide a control mechanism for a reciprocable member adapted to occupy a plurality of positions, in which the shifting of said reciprocable member into its respective position is effected instantaneously, whereupon the said member is positively held in its respective position.

It is another object to provide a control mechanism in connection with a rotary member, in which the rotary member is moved instantaneously from one angular position to another angular position and vice versa, while means is provided for positively holding the said rotary member in its respective position.

A further object of the invention consists in the provision of a control mechanism for a reciprocable member adapted to occupy a plurality of positions, in which power storage means is adapted instantaneously to shift the reciprocable member from one position into its next position, and in which the loading of said power storage means is effected by hydraulic motor means.

These and other objects and advantages of the invention will appear more clearly from the following specification in connection with the accompanying drawing, in which:

Figure 1 illustrates the invention diagrammatically, by way of example, in connection with a rotary valve.

Figure 2 is a section through the rotary valve of Figure 1.

Figure 3 is a section along the line 3—3 of Figure 2.

Figure 4 is a section along the line 4—4 of Figure 2.

General arrangement

The control mechanism according to the invention substantially comprises a reciprocable member movable into a plurality of positions by power storage means, such as yielding or spring means. The power storage means is loaded by a hydraulic motor, while a locking mechanism holds the reciprocable member locked in its respective position during the loading of the said power storage means.

After the power storage means has been loaded, a release mechanism is actuated at a desired time for releasing the locking mechanism, thereby allowing the power storage means to shift the reciprocable member instantaneously and with a snap action into its next position at which the locking means will automatically again lock it and hold it locked until the next shifting operation is effected in the manner set forth above.

Structural arrangement

Referring to the drawing in detail, the structure shown therein comprises a fluid operable motor, generally designated 10, and including a double-acting piston 11, having connected to one side thereof a plunger 12 and to the other side thereof a control rod 13. The control rod 13 carries, adjustably mounted thereon, cam members 14 and 15 adapted to actuate locking members, generally designated 16 and 17.

The locking members 16 and 17 (Figure 2) are of identical construction and, therefore, only one of them will be described, while the other member will be designated with the same numerals, however, with the additional letter a.

The locking member 17 consists of a rod 18 passing through the cover 19 of the rotary valve, generally designated 20, and being provided at its lower end with a flange 21. The upper end of the rod 18 is rigidly connected to a cap 22 in any convenient manner, for instance, by means of a threaded pin 23.

Interposed between the cap 22 and a recess 24 in the cover 19 is a spring 25, which continuously urges the cap 22 and thereby the rod 18 upwardly. The upward movement of the rod 18 is limited by a dish-shaped disc 26 adapted to abut the flange 21, and is prevented from rotation in any convenient manner, for instance by a pin 31 rigidly connected to the cover 19. The disc 26 is interposed between the cover 19 and a locking disc 27, which latter is provided with two circular notches 28 and 29 adapted selectively to be engaged by the flanges 21 and 21a. The locking disc 27 is furthermore provided with a recess 30 engaged by the pin 31. As will be clear from the drawings, the pin 31 limits the angular movement of the locking disc 27 so that the latter cannot move beyond a predetermined point before it is locked by engagement of the flanges 21 and 21a with the respective notches 28 and 29. The locking disc 27 is rigidly connected, for instance, by welding, to a sleeve 32, which latter is connected to the rotary valve member 33 by means of a pin 34.

The rotary valve member 33 is provided at its ends with extensions 35 and 36 respectively journalled in anti-friction bearings 37 and 38, which bearings are housed in the valve casing 39. The valve member 33 is also provided with a longitudinal bore 40 communicating with radial passageways 41 and 42, adapted selectively to be connected with the conduits 43 and 44, of which the conduit 44 communicates with a conduit 45 leading to one end of the cylinder 46 of the motor 10, whereas the conduit 43 communicates with a conduit 47 leading to the other end of the cylinder 46. The radial passageways 41 and 42, forming an angle with each other, extend completely through the valve member 33 for balancing the valve member, and are in continuous hydraulic connection with the longitudinal bore 40 of the valve member 33. The valve member 33 is furthermore provided with an annular groove 48, which is in continuous communication with the conduit 49 leading to the pressure side of a fluid source, such as a pump 50. The suction side of the pump 50 communicates with a fluid tank 51 through a conduit 52.

The annular groove 48 also communicates with a groove or passageway 53 provided on the periphery of the valve member 33 and extending to the level of the connecting points of the conduits 44 and 43 with the valve casing 39, thereby selectively establishing fluid connection between the annular groove 48 and the conduit 43 or 44.

Rigidly connected to the extension 36 of the valve member 33, for instance by a pin 54, is a sleeve 55. The sleeve 55 is provided with a bore 56 arranged in alignment with the longitudinal bore 40 of the valve member 33 and communicating with the interior of a casing 57 connected to the valve casing 39 in any convenient manner, for instance by bolts 58. The interior of the casing 58 is connected through a conduit 59 with the tank 51. The sleeve 55 has a flange provided with an annular groove 60 housing two equal springs 61 and 62. Two adjacent ends of the springs 61 and 62 engage a pin 63 rigidly connected to the sleeve 55. The other two adjacent ends of the springs 61 and 62 engage a pin 64 (see Figure 3), which is rigidly connected to a disc 65. The disc 65, in its turn, is rigidly connected, for instance by welding, to a tubular member or sleeve 66 adapted to rotate about the pivot pin 67 carried by the casing 57.

The tubular member 66 has furthermore rigidly connected thereto an arm 68 which engages an annular recess 69 in a fluid operable plunger 70 cooperating with cylinders 71 and 72 in such a manner that admission of pressure fluid to the cylinder 71 will move the plunger 70 toward the cylinder 72, whereas admission of pressure fluid to the cylinder 72 will cause the plunger 70 to move toward the cylinder 71. The cylinder 71 is connected by a conduit 73 with the conduit 47, whereas the cylinder 72 communicates with the conduit 45. The cylinders 71 and 72 preferably form an integral case unit with the casing 57.

*Operation*

Assuming that the plunger 12 is intended to perform a working cycle, and that the locking disc 27 is locked by the locking member 17, while the locking member 16 occupies the position shown in Figure 2. It may furthermore be assumed that the valve member 33 occupies the position shown in Figure 2, in which the conduit 43 communicates through the passageway 53 and annular groove 48 with the pressure line 49, while the passageway 42 communicates with the conduit 44.

To start a working cycle, the operator starts the pump 50. Pressure fluid from the pump 50 then flows through the conduit 49, annular groove 48, passageway 53, conduits 43 and 47 to the right hand end of the cylinder 46 where it acts upon the piston 11 so as to move the latter and thereby also the plunger 12 and control rod 13 toward the left. At the same time, fluid also flows from the conduit 43 through the conduit 73 into the cylinder 71 where it acts upon the plunger 70 and moves the same toward the cylinder 72. As a result thereof, the pin 64 moves in anticlockwise direction with regard to Figure 1 and, since movement of the sleeve 55 and thereby the pin 63 is prevented due to the fact that the disc 27 is locked by the locking member 17, the anticlockwise movement of the pin 64 loads the spring 62. The fluid expelled from the cylinder 72 during the movement of the plunger 70 toward the cylinder 72 passes through conduits 45 and 44, passageway 42, longitudinal bore 40, bore 56 and conduit 59 to the tank 51.

Pressure fluid admitted through the conduit 47 to the right hand end of the cylinder 46 acts upon the plunger 12 so as to move the latter toward the left. Fluid expelled from the cylinder 46 during this leftward movement of the piston 11, passes through the conduits 45, 44, passageway 42, longitudinal bore 40, bore 56 and conduit 59 to the tank 51. Leftward movement of the piston 11 also causes the plunger 12 and control rod 13 connected to the said plunger to move toward the left.

The cam member 15 is so adjusted on the control rod 13 that when the plunger 12 has performed its leftward stroke, the cam member 15 has reached such a position that it presses the locking member 17 downwardly into the unlocking or releasing position. Therefore, at the end of the leftward movement of the plunger 12 just described, the cam member 15 slides up on the locking member 17 and moves the latter downwardly to such an extent that the flange 21 releases the slot 28.

Since, as previously mentioned, the spring 62 was loaded, and the pin 64 at this time is held stationary by fluid pressure acting in the cylinder 71, the movement of the member 17 in its releasing position causes the spring 62 instantaneously and with a snap action to move the pin 63 and thereby the sleeve 55 and valve member 33 connected thereto, as well as the disc 27, in anticlockwise direction until the disc 27 and thereby the valve member 33 and sleeve 55 connected thereto are stopped by engagement of the pin 31 with the left end of the recess 30. In this position, the notch 29 registers with the flange 21a and the spring pertaining to the locking member 16 and corresponding to the spring 25 of locking member 17, lifts the rod 18a so as to cause the flange 21a to engage the notch 29. In this way the disc 27 and, consequently, also the valve member 33 and sleeve 55, are positively locked in their respective position.

Due to the shifting movement of the sleeve 55, disc 27 and valve member 33, as just described, the passageway 42 has moved out of alignment with the conduit 44 but into alignment with the conduit 43, while the passageway 53 has moved out of alignment with the conduit 43 and now registers with the conduit 44. Consequently, pressure fluid from the pump 50 now flows through conduit 49, annular groove 48, passageway 53 and conduit 44 to the left hand side of the cylinder 46, while fluid connection has been established between the right hand end of the cylinder 46 and the tank 51 through conduits 47 and 43, passageway 41, bores 40 and 56 and the conduit 59. Therefore, pressure fluid delivered by the pump 50 now moves the piston 11 and thereby the plunger 12 and control rod 13 toward the right, and at the same time flows to the cylinder 72 and causes the plunger 70 to move toward the cylinder 71. This movement of the plunger 70 causes the disc 65 to move in clockwise direction, thereby loading the spring 61 in the manner previously described in connection with the loading of spring 62.

When the plunger 12 has reached the desired end of its rightward movement, the cam member 14, which has been set accordingly, depresses the locking member 16 into the position shown in Figure 2, thereby releasing the notch 29 and causing the spring 61 to move the disc 27 and thereby also the valve member 33 and sleeve 55 in clockwise direction. When, during this clockwise movement of the disc 27, the pin 31 engages the right end of the recess 30, it stops movement of the disc 27, valve member 33 and the sleeve 55. Since, now, the notch 28 again occupies the position shown in Figure 4, the spring 25, pertaining to the locking member 17, lifts the latter to such an extent that the flange 21 engages the notch 28, thereby positively locking the disc 27, valve member 33 and sleeve 55 in their respective position. All parts now again occupy the initial position, whereupon another working cycle of the plunger 12 may be started in the manner described above.

It will be understood that I desire to comprehend within my invention such modifications as come within the scope of the claims.

Having thus fully described my invention, what I claim as new and desire to secure by Letters Patent, is:

1. In a control system, a hydraulic motor, valve means rotatable to control the supply of actuating fluid to said motor, a first rotatable member connected with said valve means, a second rotatable member movable relative to said first member, spring means interconnecting said members, locking means normally locking said first rotatable member in its respective position, fluid operable means hydraulically connected with said motor means for moving said second member selectively in clockwise or anti-clockwise direction through a predetermined angle, means associated with said second member and operable in response to the movement thereof by said fluid operable means for loading said spring means, and adjustable cam means controlled by said motor means and operable selectively to unlock said first rotatable member following the movement of said second rotatable member through said predetermined angle.

2. In a control system, a hydraulic motor, a source of pressure fluid for supplying actuating fluid to said motor, rotatable valve means connecting with said source and said motor and movable to control the supply of fluid from said source to said motor, a first rotatable member connected with said valve means, a second rotatable member, spring means connecting said members and continuously urging the same toward a predetermined relative position, fluid operable means associated with said second member for rotating the same so as to load said spring means, locking means operable normally positively to lock said first rotatable member in its respective position, means hydraulically connecting said fluid operable means with said motor, and means responsive to a predetermined but variable stroke of said motor for temporarily making said locking means ineffective thereby to permit the loaded spring means to move said first rotatable member into said predetermined position relative to said second rotatable member.

3. In a control system, fluid motor means including a double acting piston having a control rod secured to one side and a plunger secured to the other side thereof, a fluid source, valve means connecting said fluid source with said fluid motor and movable to control the supply of actuating fluid to said motor, a first movable member operatively associated with said valve means for moving the same, locking means normally locking said first member in its respective position, a second movable member movable relative to said first member, yielding means connecting said movable members, fluid operable means hydraulically connected with said motor means operable to move said second member relative to said first member thereby to cause said yielding means to store power, a pair of spaced cam members secured to said control rod and each adapted selectively to move said locking means into interlocking position at a predetermined position of travel of said control rod, thereby to permit said yielding means to restore said movable members to their initial relative position.

GEORGE A. WALDIE.